US 6,725,266 B1

(12) United States Patent
Sordi

(10) Patent No.: US 6,725,266 B1
(45) Date of Patent: Apr. 20, 2004

(54) SYSTEM AND METHOD FOR CHANGING THE STATUS OF A SYSTEM SERVICE

(75) Inventor: Marc Anthony Sordi, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 686 days.

(21) Appl. No.: 09/680,350

(22) Filed: Oct. 5, 2000

(51) Int. Cl.[7] .............................................. G06F 15/173
(52) U.S. Cl. ...................... 709/226; 709/224; 709/223; 718/100; 719/318
(58) Field of Search .................. 709/223, 106, 709/205, 224, 226, 227, 220; 713/100; 719/310, 318, 313; 718/100, 102, 105, 104, 106; 714/48

(56) References Cited

U.S. PATENT DOCUMENTS

| | | | | |
|---|---|---|---|---|
| 5,109,486 A | * | 4/1992 | Seymour ..................... | 709/224 |
| 5,524,253 A | * | 6/1996 | Pham et al. .................. | 709/202 |
| 6,012,084 A | * | 1/2000 | Fielding et al. .............. | 709/205 |
| 6,269,396 B1 | * | 7/2001 | Shah et al. ................... | 709/223 |
| 6,301,266 B1 | * | 10/2001 | Peterson et al. ............. | 370/465 |
| 6,466,978 B1 | * | 10/2002 | Mukherjee et al. .......... | 709/225 |
| 6,480,955 B1 | * | 11/2002 | DeKoning et al. ........... | 713/100 |
| 6,584,499 B1 | * | 6/2003 | Jantz et al. ................... | 709/220 |

* cited by examiner

Primary Examiner—Ario Etienne
Assistant Examiner—Abdullahi E. Salad

(57) ABSTRACT

A system for changing the status of at least one system service, which includes at least one external data manager object for indicating the status of the at least one system service available to request sources, at least one internal data manager object for indicating the status of the at least one system service that is available to connected sources, and a configuration task for maintaining the at least one external data manager object and the at least one internal data manager object.

24 Claims, 4 Drawing Sheets

SYSTEM AND METHOD FOR CHANGING THE STATUS OF A SYSTEM SERVICE

The present invention generally relates to an improved system and method for changing the status of one or more system services over an insecure network. More specifically, it relates to a system and method for changing the status of one or more system services that can handle rapid status changes.

A computer commonly utilizes various services, such as different protocol services. This is especially true in a network system. Whenever the status of a service is changed, it is generally required that the computer be rebooted, meaning the computer has to be restarted or the power source must be turned off and on, before the status change of the service can take effect. Because user intervention is needed (e.g., rebooting the computer), prior methods are not equipped to handle any rapid changes of the service status, since the computer must be restarted every time a service status is changed.

One prior method of allowing a request source to initiate and disable the service involved sending a status change notification to the registered connected sources, which are sources that are registered to receive a notification whenever the service status has been changed. Once the connected sources finished handling the last event with this protocol, the service was informed, but not the request source, who was actually disabling the service.

One problem with this prior method was that since the request source had no way of knowing if the connected sources using the service had finished with their last operations, the request source could disable the service prematurely, before the connected sources had a chance to finish the last operation with the service. This could cause an error in the computer or network system, or worst, unknown system behavior.

Still another problem with this prior method was that by allowing a request source to be disabled, the system could be abused, such as by continuous and rapid changes to the service status, which could cause multiple conflicting status change notifications to be sent internally throughout the system. These conflicting internal notifications could easily slow down the processing speed of the computer or network to the point of being no longer effective. In the worst cases, the computer or network system could become so confused that it could not be fully recovered.

Accordingly, a primary object of the present invention is to provide an improved system and method for changing the status of one or more system services that can handle the rapid status changes of the services.

Yet another object of the present invention is to provide an improved system and method for changing the status of one or more system services that does not disable the service until all connected sources have completed their operations with the service or a predefined timeout has expired.

Other objects, features and advantages will become apparent upon reading the detailed description set forth herein, in conjunction with the attached drawings.

BRIEF SUMMARY OF THE INVENTION

The present invention generally relates to an improved system and method for changing the status of one or more system services. More particularly, it relates to a system and method for changing the status of one or more system services that can handle rapid status changes.

The present invention provides an improved system and method for changing the status of one or more system services that can handle rapid status changes. With the use of an external data manager object and an internal data manager object, the present invention prevents the services from being prematurely disabled, and gives all the connected sources an opportunity to complete their operations with the service. In addition, the status change of the service can be achieved without any user intervention, such as a computer reboot (i.e., restarting the computer). Furthermore, these systems can be susceptible to rapid status change requests but cannot handle such requests as rapidly as they can be received.

The present invention includes at least one external data manager object for indicating the status of one or more system services that are available to request sources, at least one internal data manager object for indicating the status of one or more system services that are available to connected sources, and a configuration task for maintaining the external data manager object and the internal data manager object.

DETAILED DESCRIPTION

Broadly stated, the present invention is directed to an improved system and method for changing the status of at least one system service. With the use of an internal data manager object and an external data manager object, the present invention provides a way to handle rapid status changes of the system services. In addition, a service will not be disabled until all the connected sources have finished processing their last operations with the service. As a result, all synchronization errors caused by the rapid and continuous changes of the service status are mostly eliminated.

Figure 1:
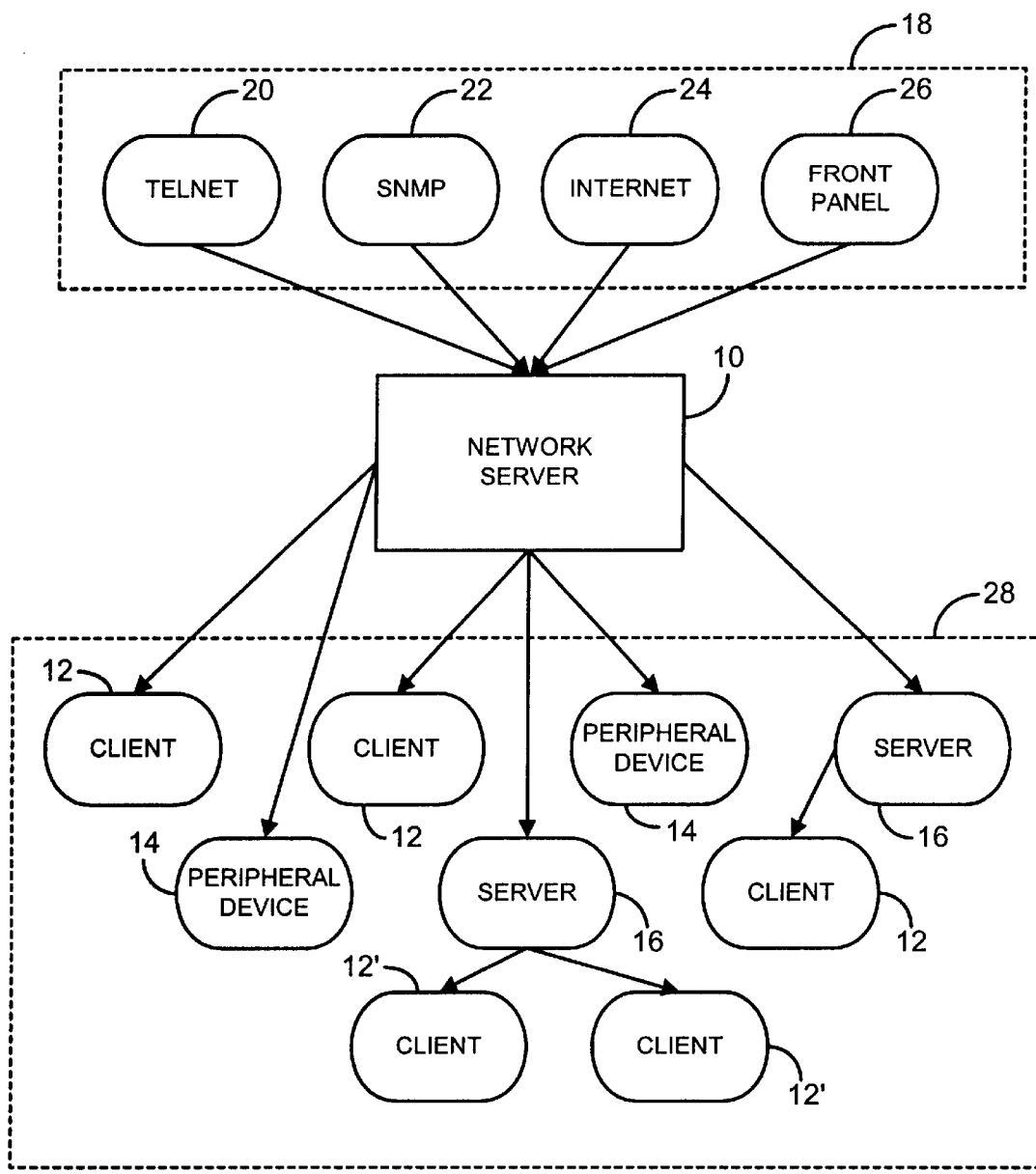
FIG. 1 is a schematic diagram of an exemplary network architecture in which the present invention can be implemented.

Turning now to FIG. 1, a schematic diagram of an exemplary network architecture is shown. Although the present invention is preferably implemented within a network environment, the present invention can be implemented in almost any computer system having one or more services. For example, the present invention can be used in a stand-alone personal computer having various services from its application or peripheral devices. The network diagram serves only as an example, and it should understood that the present invention can be implemented with almost any system that has at least one computer with at least one available service. And these other implementations are within the scope of the present invention.

As shown in FIG. 1, a network server 10 is connected to multiple sources, such as clients 12, a peripheral device 14, and a server 16 connected to other clients 12'. A service status change request can be made by any one of the sources 12, 14, 16, 12', and the source that is requesting a service status change is referred to as a request source 18. Four major communication channels are shown as examples, specifically telnet 20, simple network management protocol ("SNMP") 22, Internet 24, and peripheral device front panel 26. Using these communication channels, a request source 18 makes a status change request for a particular service. Then sources that are not considered the request source will be referred to as connected sources 28, and the requested sources that are registered to receive a status change notification whenever the status of that particular system service changes will be referred to as the registered connected sources.

Figure 2:
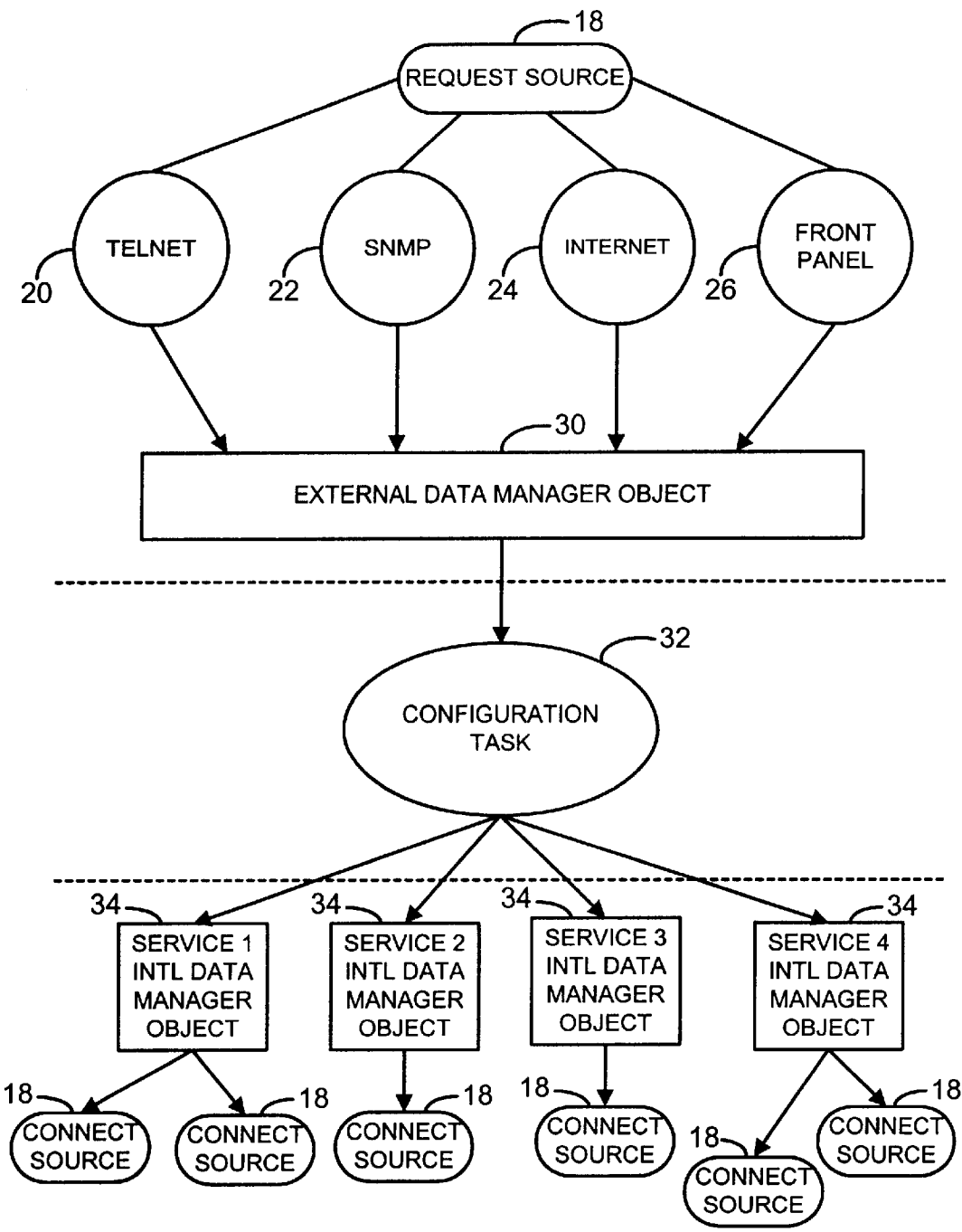
FIG. 2 is an overall view of one preferred implementation of a single external data manager object for indicating the status of all predefined system services.
Figure 3:
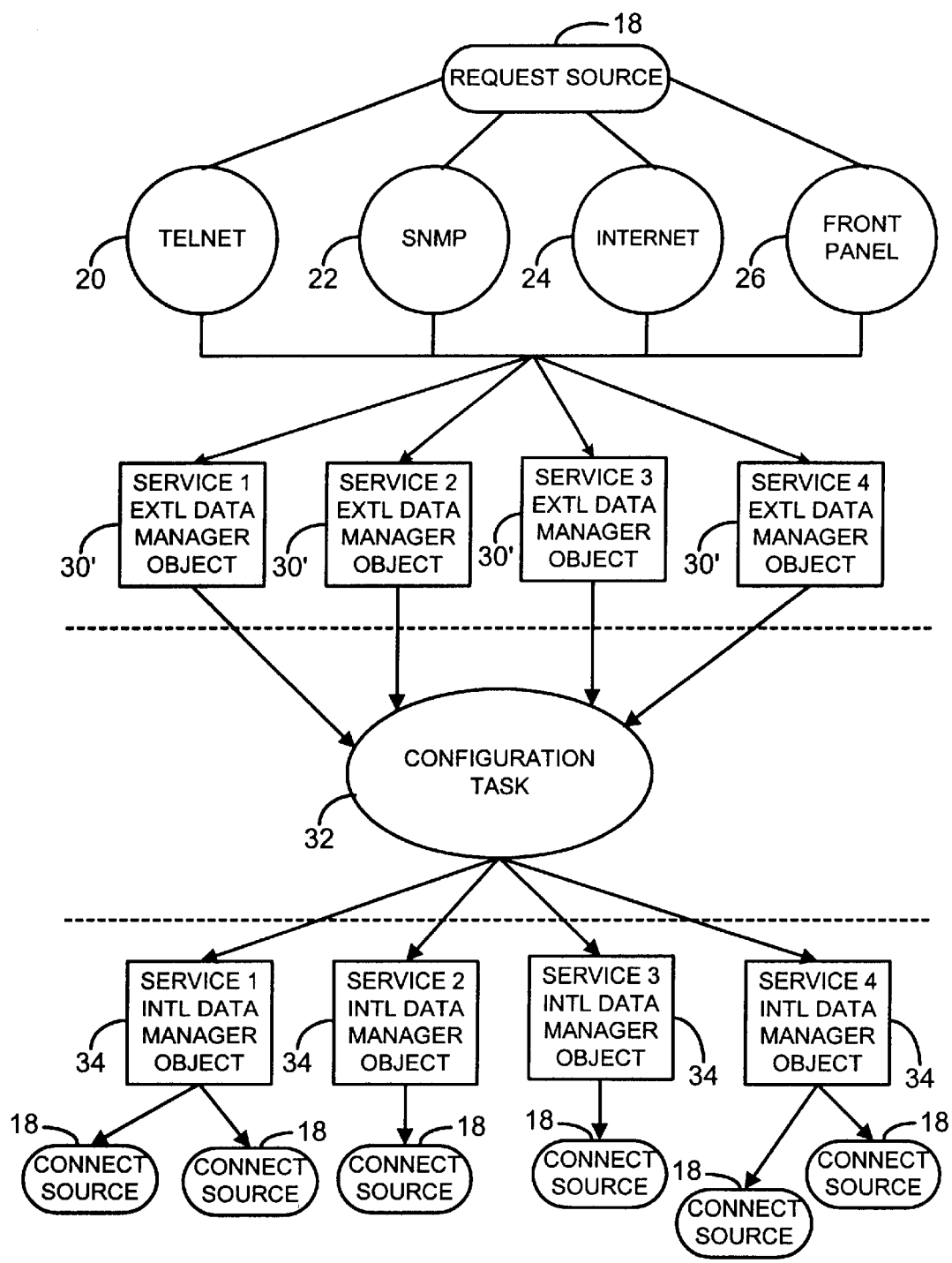
FIG. 3 is an overall view of another preferred implementation of an external data manager object for each system service; and, FIG. 4 is a flowchart showing the process of the configuration task.

Turning now to FIGS. 2 and 3, two preferred implementations are shown. In FIG. 2, the request source 18 communicates through four communication channels 20, 22, 24, 26 with a single external data manager object 30 that indicates the status of all the system services that are predefined in a particular set. For example, if this is an implementation for protocol services, the single external data manager object 30 will indicate the status of a Novell protocol, a data link control ("DLC") protocol, a transmission control protocol over an Internet Protocol ("TCP/IP") protocol, and an appletalk protocol.

As previously noted, the request source (i.e., a source requesting a status change) can only view and control the external data manager object 30. When a request source changes a service status on the external data manager object, a notification is sent to a configuration task 32, which has previously registered with the system to obtain such notification. After receiving such notification, the configuration task will respond with different processing on the internal data manager object 34 depending on the request of the service status change.

For the internal data manager objects 34, it is preferred that each service be assigned to a respective internal data manager object. The purpose of separating the services into different data manager objects is to ensure that the connected source 28 is not contacted unnecessarily every time a service status is changed even when it has no connection to that particular service in the system. In fact, in the implementation shown in FIG. 3, each service has its own external data manager object 30' and internal data manager object 34. Furthermore, only the registered connected sources (i.e., connected sources that are registered to a status change notification whenever the system service status on the internal data manager object is changed) can view the internal data manager object. Put differently, the registered connected source is notified whenever that particular internal data manager object that it registered for changes. As a result, if a connected source 28 does not utilize a specific service, it will not be notified unnecessarily whenever there is a system service status change, particularly when the status change is unrelated to this connected source.

The implementation of using a single external data manager object 34 is better suited for prior technology and compatibility. However, the implementation of each service having an external data manager object 30' and an internal data manager object 34 is preferred, because the configuration task only has to synchronize the data manager objects for only that requested service. As a result, this implementation is more efficient. It should be understood that both implementations and other slightly varied implementations are contemplated and are within the scope of the present invention.

Figure 4:
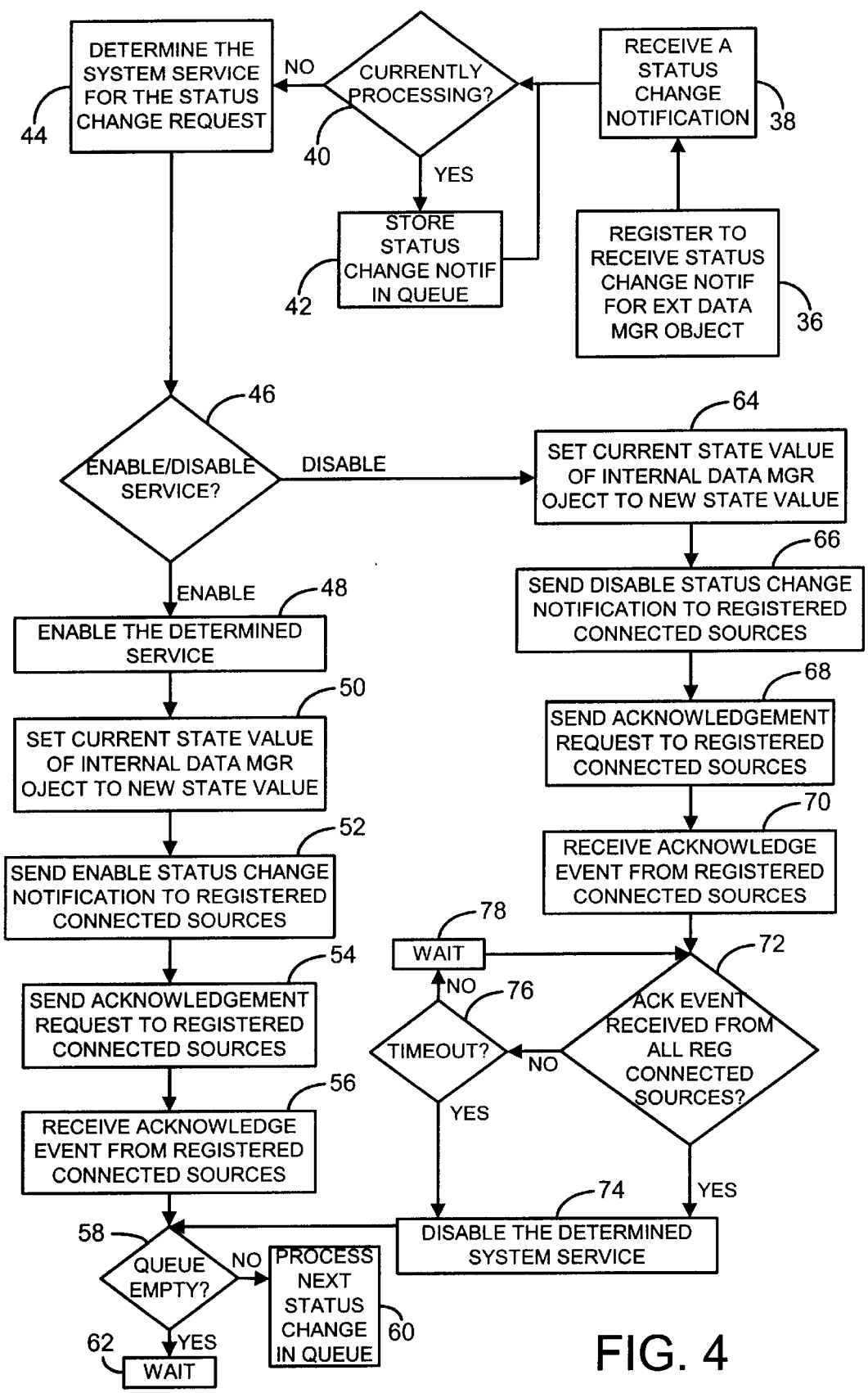

Turing now to FIG. 4, a flowchart of the configuration task process is shown. The configuration task 32 begins by registering with the system to receive a status change notification when a service status of the external data manager object 30 changes (block 36). In other words, the system will send a status change notification to the configuration task 32 whenever a request source 18 changes a service status of the external data manager object 30.

Next, when the configuration task 32 receives such a status change notification from the system (block 38), it determines whether another status change notification is being processed (block 40). If so, the status change notification will be stored in a queue (block 42). Otherwise, the configuration task 32 continues to process the notification and determines which system service status has been changed on the external data manager object 30 by a request source (block 44). It is preferred that the next status change in the queue will not process until the process of the previous change had been completed. The configuration task 32 next determines whether the status change is to enable or disable the service (block 46). It is preferred that the status change notification include a new state value, which will indicate the service and the requested action of the status change.

In the implementation of a single external manager object 30 shown in FIG. 2, there will be four bits for four services, wherein each bit is designated to indicate the status of a particular service. In this case, the configuration task 32 determines which bit has changed by comparing it to a current value of the internal data manager objects 34. However, for the implementation of having an external data manager object 30 and an internal data manager object 34 for each service, the configuration task 32 need not compare the state values. Rather, it knows to go to the internal data manager 34 that has the same service as the external data manager object that changed. It is contemplated that the configuration task process can be altered slightly to accommodate the specific implementations. It should be understood that these other methods are within the scope of the present invention.

If the status change is to enable the system service (block 46), the configuration task 32 will first enable the determined system service (block 48), which is followed by setting the current state value of the internal data manager object for the determined system service to the new state value (block 50). In other words, the internal data manager object will be changed to a state value of an enable, generally a "1". The configuration task 32 next sends an enable status change notification to all the registered connected sources, which are connected sources that registered to receive a notification whenever the status of that particular system service of the internal data manager object changes (block 52). This is to let all the registered connected sources know that the service is now enabled and ready to be used.

Although not necessary to the implementation of the present invention, the configuration task 32 can send an acknowledgement request to all the registered connected sources (block 54). This step is not essential to the present invention, because in practice the configuration task 32 does not necessarily need to know whether the registered connected sources received the notification for further processing since it already enabled the service for usage. However, it is preferred that the configuration task 32 receive an acknowledgement event from the registered connected sources (block 56) for a more detailed system management process, which may be more desirable for a network system. Next, the configuration task 32 determines whether the queue storing the status change notification is empty (block 58). If not, the next status change notification stored in the queue will be processed (block 60). Otherwise, the configuration task 32 waits until the next status change notification arrives (block 62) and start the process again (block 36).

In contrast, when the status change is to disable the service (block 46), the configuration task 32 will first set the current state value of the internal data manager object to the new state value of the external data manager object (block 64). Then, it sends a disable status change notification to all the connected sources that are registered to be notified whenever the status of that particular service of the internal data manager object changes (block 66). The configuration task 32 also sends an acknowledgement request to all the registered connected sources (block 68), but it is very important that it receives back an acknowledgement event from the registered connected sources (block 70), because the service will not be disabled unless either a timeout expires or an acknowledgement event has been received from all the registered connected sources.

The configuration task 32 next determines whether an acknowledgement event has been received from all the registered connected sources (block 72), if so, the determined system service will be disabled (block 74). Otherwise, the configuration task 32 determines whether a timeout has expired (block 76). If so, the configuration task 32 again disables the determined system service (block 78). If not, the configuration task 32 waits (block 72) and reloops to the step of determining whether an acknowledgement event has been received from all the registered connected sources (block 72). The configuration task 32 next determines whether the queue storing the status change notification is empty (block 58). If the queue is not empty (block 58), the next status change notification stored in the queue will be processed (block 60). Otherwise, the configuration task 32 waits until the next status change notification arrives and start the process again (block 62).

From the foregoing description, it should be understood that an improved system and method for changing the status of at least one system service have been shown and described which have many desirable attributes and advantages. The system and method allows changing of the status of one or more system services that can handle rapid status changes. Furthermore, the present invention avoids disabling the service until all sources have finished their operations with the service or a reasonable timeout has expired. As a result, the present invention handles any rapid status changes of the system services without causing great confusion and conflicts to the system, and avoiding possible unknown system behaviors.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for changing the status of at least one system service, comprising:
   at least one external data manager object for indicating the status of said at least one system service available to request sources;
   at least one internal data manager object for indicating the status of said at least one system service that is available to connected sources, which register for a status change notification when the system service status of said at least one internal data manager object changes; and,
   a configuration task for maintaining said at least one external data manager object and said at least one internal data manager object, said configuration task registers for a status change notification when said at least one system service status of said at least one external data manager object changes and stores said status change notification in a queue when a previous status change notification is being currently processed.

2. The system as defined in claim 1 wherein said at least one system service includes any one from the group of a transmission control protocol, Novell protocol, data link control protocol, and Appletalk protocol.

3. The system as defined in claim 1 wherein said at least one external data manager object indicates the status of all said at least one system service.

4. The system as defined in claim 1 wherein said at least one external data manager object indicates the status of one of said at least one system service.

5. The system as defined in claim 1 wherein each said at least one internal data manager object indicates the status of one of said at least one system service.

6. The system as defined in claim 1 wherein said status change notification includes a new state value indicating the status of said at least one system service.

7. The system as defined in claim 6 wherein said new state value is compared by said configuration task with a current state value of said internal data manager object to determine which system service status has been changed.

8. The system as defined in claim 7 wherein said configuration task enables said determined system service when said status change notification indicates a service enable request.

9. The system as defined in claim 8 wherein said configuration task changes said current state value of said internal data manager object to said new state value of said external data manager object.

10. The system as defined in claim 9 wherein said configuration task sends an enable status change notification to said connected sources that are registered to receive said status change notification.

11. The system as defined in claim 9 wherein said registered connected sources sends an acknowledgement event to said configuration task to acknowledge said enable status change notification.

12. The system as defined in claim 7 wherein said configuration task changes said current state value of said internal data manager object to said new state value of said external data manager object when said status change notification indicates a service disable request.

13. The system as defined in claim 12 wherein said configuration task sends a disable status change notification to said connected sources that are registered to receive said status change notification.

14. The system as defined in claim 13 wherein said configuration task:
   sends an acknowledgement request to said registered connected sources; and,
   waits for the receipt of an acknowledgement event from all said registered connected sources.

15. The system as defined in claim 14 wherein said configuration task disables said determined system service once an acknowledgement event has been received from all said registered connected sources.

16. The system as defined in claim 14 wherein said configuration task disables said determined system service when a timeout expires before an acknowledgement event has been received from all said registered connected sources.

17. A method for changing the status of at least one system service using at least one external data manager object to indicate the status of said at least one system service to request sources and at least one internal data manager object to indicate the status of said at least one system service to connected sources, said method comprising the steps of:

registering to receive a status change notification having a new state value when a system service status of said external data manager object is changed responsive to a system service status change request from a request source;

determining the system service for the status change once said status change notification is received;

determining whether said status change is to enable or disable said determined system service;

enabling the determined system service when the status change notification indicates a service enable request; and, changing the current state value of the internal data manager object to the new state value of the external data manager for said determined system service when the status change notification indicates a disable service request.

18. The method according to claim 17 wherein said enabling step further comprising the steps of:

changing the current state value of the internal data manager object to the new state value of the external data manager object for said determined system service; and, sending an enable status change notification to the connected sources that are registered to receive a status change notification for said determined system service.

19. The method according to claim 18 wherein said sending step further comprising the steps of:

sending an acknowledgement request to said registered connected sources; and, receiving acknowledgement events from said registered connected sources.

20. The method according to claim 17 wherein said changing step further comprising the step of sending a disable status change notification to the connected sources that are registered to receive a status change notification for said determined system service.

21. The method according to claim 20 wherein said sending step further comprising the steps of:

sending an acknowledgement request to said registered connected sources;

receiving said acknowledgment request from said registered connected sources; and, determining whether an acknowledgement event has been received from all said registered connected sources.

22. The method according to claim 21 further comprising the step of:

determining whether a timeout expires;

disabling the determined system service when said timeout is expired;

waiting for the receipt of an acknowledgement event from all said registered connected sources when said timeout is not expired; and, disabling said determined system service once an acknowledgement event is received from all said registered connected sources.

23. The method according to claim 21 further comprising the step of disabling said determined system service once an acknowledgement event is received from all said registered connected sources.

24. A system for changing the status of at least one system service using at least one external data manager object to indicate the status of said at least one system service to request sources and at least one internal data manager object to indicate the status of said at least one system service to connected sources, said system comprising:

means for registering to receive a status change notification having a new state value when a system service status of said external data manager object is changed responsive to a system service status change request from a request source;

means for determining the system service for the status change once said status change notification is received;

means for determining whether said status change is to enable or disable said determined system service;

means for enabling the determined system service when the status change notification indicates a service enable request; and, means for changing the current state value of the internal data manager object to the new state value of the external data manager for said determined system service when the status change notification indicates a disable service request.

\* \* \* \* \*